H. I. MORRIS.
APPARATUS FOR LAYING OR FORMING TIRE TREADS.
APPLICATION FILED JULY 17, 1917.
1,353,933.
Patented Sept. 28, 1920.
3 SHEETS—SHEET 3.
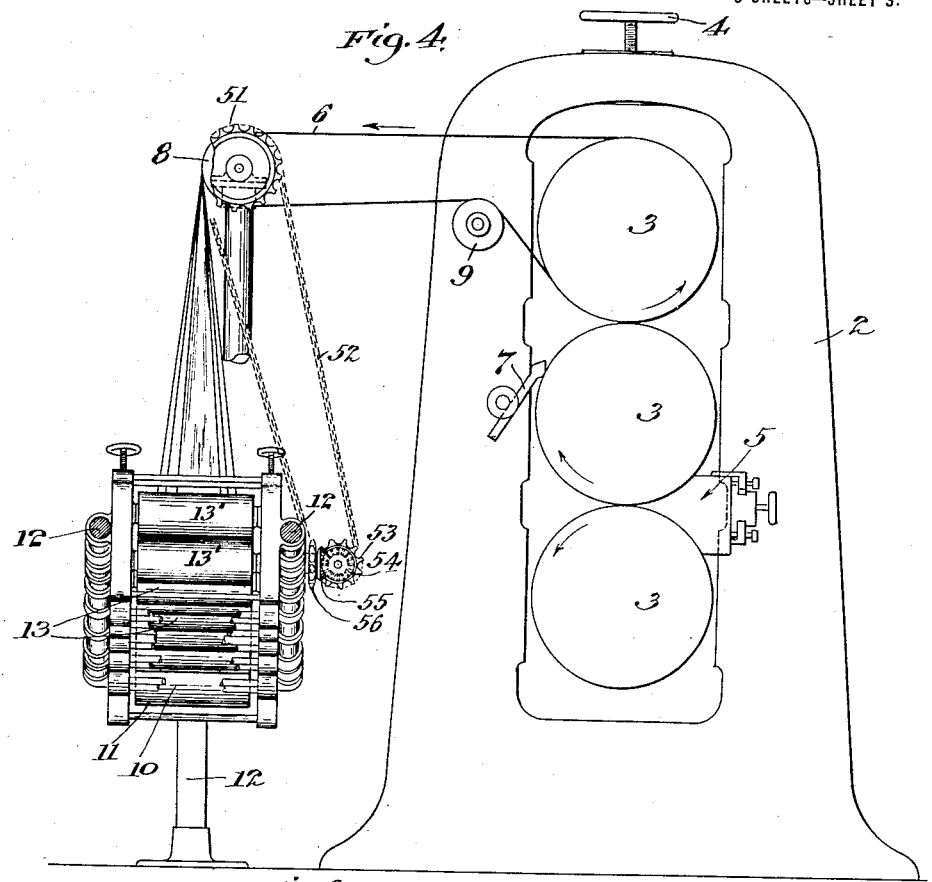
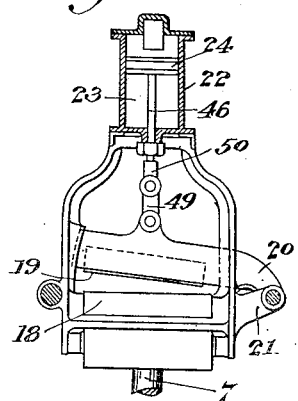
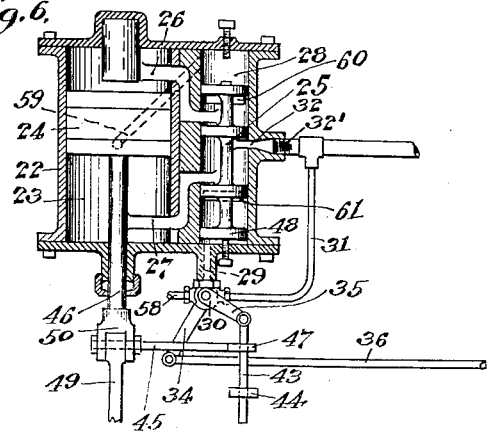
WITNESSES:
INVENTOR.
Howard I. Morris,
BY
ATTORNEY

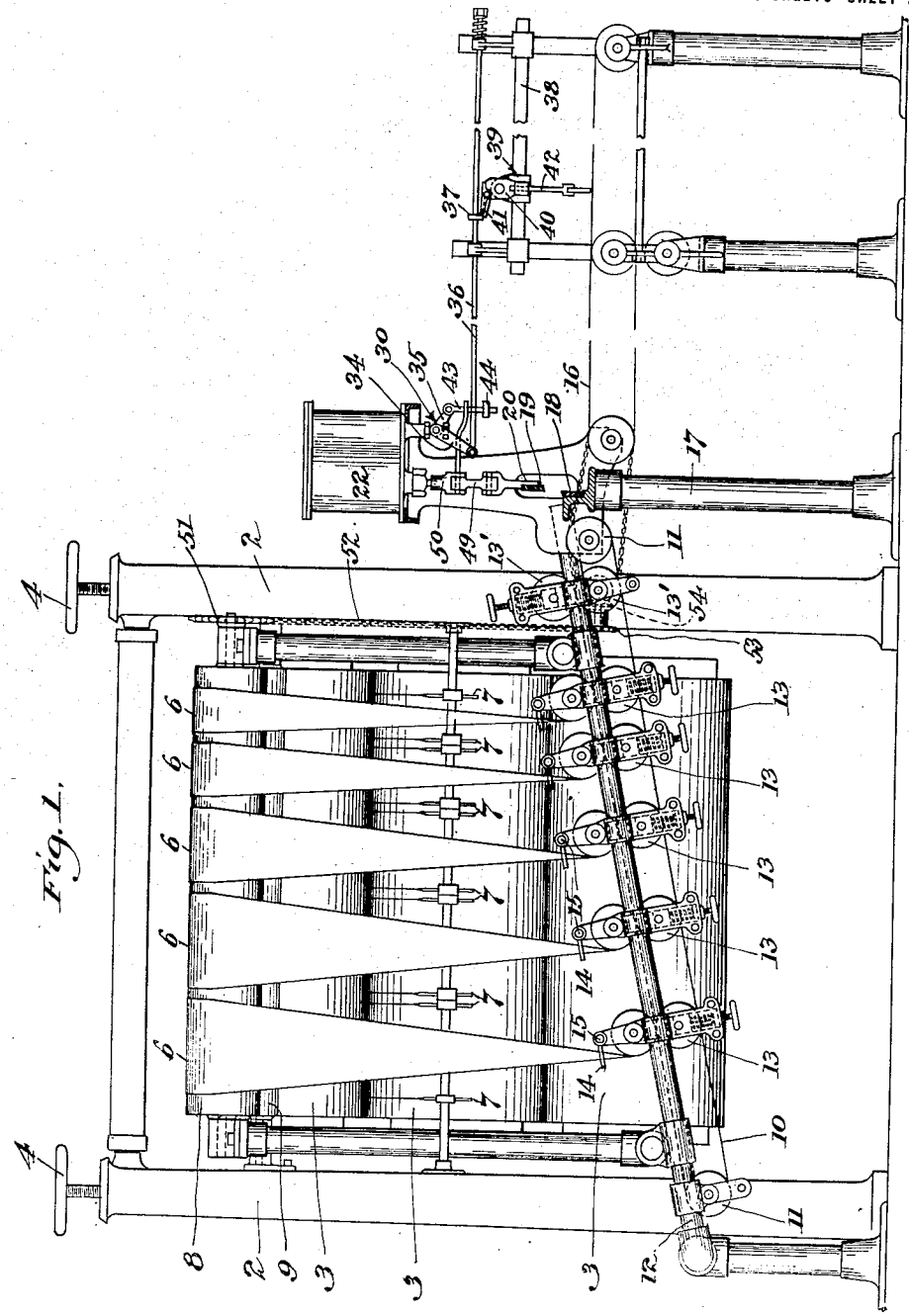

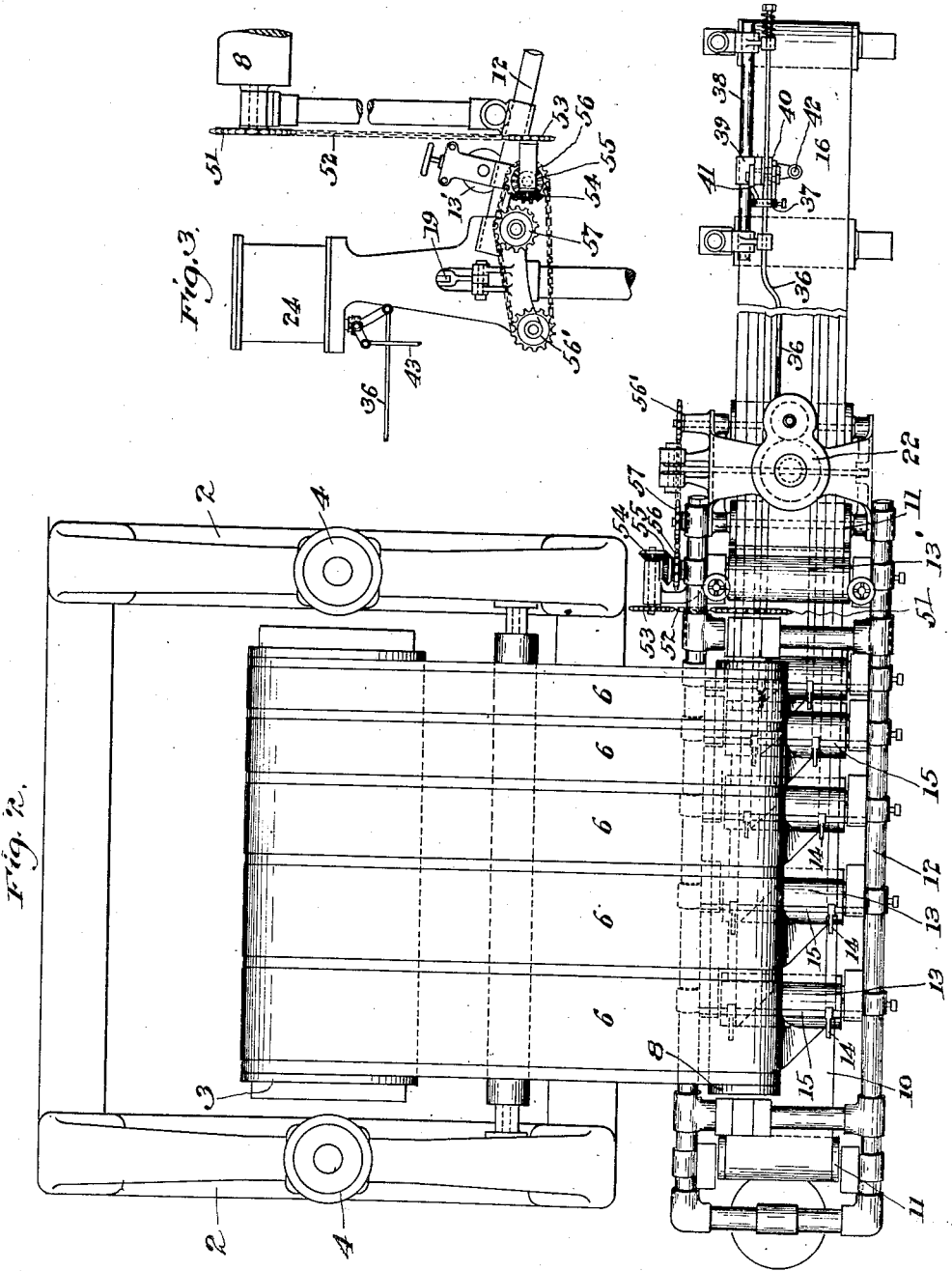

UNITED STATES PATENT OFFICE.

HOWARD I. MORRIS, OF LOS ANGELES, CALIFORNIA, ASSIGNOR, BY DIRECT AND MESNE ASSIGNMENTS, TO MORRIS TIRE MACHINERY COMPANY, A CORPORATION OF CALIFORNIA.

APPARATUS FOR LAYING OR FORMING TIRE-TREADS.

1,353,933.      Specification of Letters Patent.      Patented Sept. 28, 1920.

Application filed July 17, 1917. Serial No. 181,080.

*To all whom it may concern:*

Be it known that I, HOWARD I. MORRIS, a citizen of the United States, residing at Los Angeles, in the county of Los Angeles and State of California, have invented a new and useful Apparatus for Laying or Forming Tire-Treads, of which the following is a specification.

This invention relates to an apparatus for laying or making laminated rubber tire treads for vehicle tires, and particularly for pneumatic or automobile tires.

The primary object of the invention is to reduce to a minimum the formation or accumulation of air pockets in the tread.

A further object of the invention is to take the rubber directly from the calender without the necessity of rolling the rubber sheets in rolls while, if desired, with this apparatus rubber stock can be used from rolls.

A further object of the invention is to build up such tread while the strips or sheets of rubber still remain heated.

A further object of the invention is to provide a much quicker and more expeditious and economical method and apparatus for making such treads, and one which produces a much superior tread as it permits the rolling of the rubber into thin sheets in the calender and then into the tread, rolling down each ply of rubber separately, thus preventing air being trapped between the plies.

Further objects of the invention will be apparent from the hereinafter contained description.

The invention consists in the hereinafter described apparatus and combinations of parts which will be readily understood by reference to the accompanying drawings forming a part of this specification which show an apparatus forming a preferred embodiment of my invention, the essential elements of which are recited in the appended claims and in which—

Figure 1 is a side elevation of such apparatus.

Fig. 2 is a plan view thereof.

Fig. 3 is a side elevation of the means for driving the apparatus from one of the calendar rolls.

Fig. 4 is an end view showing the calender rolls diagrammatically.

Fig. 5 is a side elevation of the cutter knife and its connection to an automatic means for operating the same.

Fig. 6 is a longitudinal sectional view of the piston cylinder and its operating mechanism.

As shown in the drawings, 2 represents a frame in which the calender rolls 3 are mounted, 4 indicating the usual means by which the pressure of the rolls may be regulated at will. These calender rolls are heated in the usual or any approved manner and receive the mass of rubber through the usual or any approved feeding means 5.

I prefer to drive these rolls so that they turn in the directions indicated by the arrows in the drawings and the sheet of rubber is conducted through between the lower and second roll over around the back of that roll through between the central roll and the top roll and up over the top roll and on to a carrier belt 6. As the sheet of rubber passes around the central roll it is cut into the desired strips by the usual knives 7. The carrier belt 6 passes around the upper calender roll and over around a positioning roll 8. Preferably on the frame 2 of the calender an idler 9 is provided over which runs the under leg of the carrier 6.

10 represents an endless conveyer or carrier which is preferably mounted upon suitable sheaves 11 carried by a suitable framework 12 so arranged that this carrier 10 is positioned parallel to the longitudinal extension of the roll 8 and extends at an angle to the horizontal. Suitably spaced along this frame 12 are adjustable pressure rolls 13, there being one pair of such pressure rolls for each ply or strip of rubber or lamination to be used in making up the tread.

Above these rolls and suitably positioned to direct the strips of rubber to the respective rolls and position them thereon are fingers 14, there being a pair of fingers for each pair of rolls. These fingers are preferably carried upon rods 15 mounted in suitable extensions of the brackets carrying the pressure rolls 13. They may be adjustably mounted on such rods by conventional set screws (not shown).

Preferably a pair of pressure rolls 13' are mounted on the frame 12 so as to press the laminated tread after all of the plies or sheets of rubber have been applied, thus giving the completed tread a final pressing or kneading. Preferably one of these rolls 13' is power driven and the pressure of these upon the tread is much greater than that of the rolls 13.

16 represents an endless carrier forming a moving platform onto which the tread strip is delivered from the carrier 10.

I prefer to interpose between the carriers 10 and 16 automatic shearing means by which the tread strip is cut into the desired lengths. For this purpose I may mount on a suitable post or frame 17 a stationary blade or shear 18, arranged transverse to the travel of the tread, and a pivoted shear or blade 19. It is obvious that this shear 19 may be of any preferred construction and mounted and operated in any desired manner. I have indicated it in the drawings as consisting of a removable blade mounted on an arm 20 pivoted at one end on a flange or extension 21 of the frame. These details of construction are not material to my invention as such may be of various designs.

As shown, the pivoted blade 19 is suitably connected to an operating piston 24. This piston is mounted in the chamber 23 of a cylinder 22. A valve 25 is operatively mounted in the chamber 28 of the cylinder, which chamber 28 is connected with the main chamber 23 by the ducts or passages 26, 27. The chamber 28 is provided at one end with a port 29 to which is connected a three-way valve 30 to which a branch 31 of the fluid or air line is connected to supply fluid or air under pressure to operate the valve 25 in one direction. The main supply of air is preferably furnished to the valve chamber 28 through a port 32 and connection 32' at the center of the chamber and between the inner heads of the valve 25. Mechanism for operating the valve 25 may consist of levers or arms 34, 35. The arm 34 is preferably connected to a spring-actuated rod 36 carrying a collar or block 37 held in position thereon by the usual set screw so that its position on the rod 36 may be adjusted as desired. Mounted on the suitably supported rod or shaft 38 below the rod 36 is a collar or bracket 39 which is longitudinally adjustable on the shaft 38. 40 represents a block pivoted on the collar or bracket 39 and in turn provided at its top with a dog or finger 41 pivoted thereto and normally held in its raised position by the usual spring means (not shown). The block 40 is also provided with an arm 42 extending downward toward the surface of the conveyer 16. This arm is preferably adjustably mounted on the block 40 in the usual or any preferred manner, so that it may be adjusted toward or away from the surface of the carrier 16. Fluid under pressure is admitted to chamber 28 by action of spring actuated rod 36 pulling on arm 34 thereby opening valve 30 to pressure pipe 31. The pressure then forces valve 25 up. To the end of the lever 35 is pivoted an arm 43 carrying an adjustable collar 44. An arm 45 carried by the piston rod 46 and having preferably a forked end 47 embraces the arm 43 so as to contact with the collar 44 when the piston 24 is reaching its extreme downward movement, thus causing the valve 30 to be opened to exhaust the pressure fluid from the chamber 28 below the lower head 48 of the valve 25 at the instant the piston has reached its lower limit of movement.

Preferably the piston rod 46 is connected with the arm 20 of the upper shear by means of a pivoted link 49, which link is pivoted to the top of the arm 20 and in the yoke connection piece 50 on the end of the rod 46, so as to compensate for the slight lateral movement of the shear.

The upper calender roll is preferably power driven and the roll 8 is driven therefrom by the carrier or belt 6. On the end of the roll 8 is provided a sprocket 51 from which a sprocket chain 52 passes over and around a sprocket 53 mounted upon a short shaft suitably journaled in the frame. This short shaft carries a pinion 54 which meshes with a pinion 55 upon the shaft of the lower pressure roll 13'. This shaft is in turn provided with a sprocket 56 and the shaft of the front roller of the carrier 16 provided with a sprocket 56' about which a sprocket chain runs to drive these two rolls in unison, and the sprocket 57 is mounted on the upper roll of the carrier 10 and over this runs the upper leg of this sprocket chain.

By suitable adjustment of the calender rolls the sheet of rubber may be pressed to the desired thickness. The calender rolls are heated by the usual or any suitable means and the strips of rubber from the calender roll are carried over the roll 8, being suitably supported by the carrier 6 and thence down in between their respective pressure rolls 13. Preferably the carrier 10 is inclined upward so that each of the succeeding laminations or layers of rubber which are of progressively diminishing width extend from the rolls 8 to the carrier 10 shorter distances, thus minimizing the weight of such strips so pendent from the rolls 8 and minimizing the tendency thereof to stretch.

With this apparatus the strips of rubber are delivered between their respective pressure rolls 13 while still hot. The lower pair of rolls 13 receives the widest or base or foundation strip or lamination of the tread passing through these rolls. Sufficient pressure is exerted upon the strip to press out all air pockets. By the next succeeding pair of pressure rolls, the next succeeding strip or lamination is pressed onto the foundation strip as these two pass between the second pair of pressure rolls 13 being carried therethrough by the carrier 10, the second ply or lamination being pressed down onto the first lamination or strip immediately upon contact therewith and all the air is squeezed out so that the formation of air pockets or the accumulations thereof in the same is reduced to a minimum. The strips or laminations are directed into position by the fingers 14. After the last lamination or strip has been applied the completed tread is preferably subjected to the pressure of a pair of final pressure rolls 13' and from there the strip passes off the carrier 10 onto the carrier 16. The arm 42 is set so that the length of the tread strip between such arm and the shearing means will give the desired length to form the tread of the desired tire. When the tread strip on the carrier 16 contacts with this arm 42, the pressure of the tread strip thereagainst trips the dog or finger 41 out of its engagement with the collar 37. The rod 36 is then actuated by its spring to move the lever 34 and valve 30 to permit the entrance of air or liquid under pressure into the chamber 28 below the outside head of the valve 25. This valve is thereby actuated from its position as shown in Fig. 5 to its upper position cutting off communication through the port 27 and opening communication into the chamber 22 above the piston 24 through the port 26. The piston is then forced down actuating the shearing means to cut the tread strip in this measured length. Upon the piston 24 approaching the lower limit of its movement, the arm 45 contacts with the collar 44 thereby pulling down the lever 35 and closing the valve 30 from communication with the branch air supply line 31 and opening the exhaust duct thereof. The fluid or air in the chamber 28 below the lower head of the valve 25 passes out through this exhaust 58. At the same time the piston 24 having reached its lower limit will have uncovered the opening of duct 59 thereby permitting some of the pressure fluid in the cylinder above the piston to pass into the chamber 28 above the valve 25, thus forcing the valve downward to original position and insuring instant return of the piston to its upper position.

It will be understood that as the valve 25 moves up or down connecting the inlet 32 with the upper or lower cylinder ports 26 or 27 it also connects said ports 26 and 27 with exhaust ports 60 and 61 alternating with the connections to inlet 32 substantially as is done in a steam engine cylinder.

I claim:

1. In combination, a traveling belt conveyer for supporting and carrying thin heated plastic strips of rubber, a second traveling conveyer, a series of pressure rolls between which said second conveyer travels, and means for feeding said strips of rubber from said first conveyer to the surface of the second conveyer and between one pressure roll of each pair and the conveyer.

2. In combination, means for rolling a mass of heated rubber into a thin sheet and cutting the same into strips of predetermined widths, a traveling belt conveyer onto which said strips are delivered, a second traveling conveyer, a series of pairs of pressure rolls between which said second conveyer travels, and means for feeding one of said strips of heated rubber from the first conveyer to the surface of the second conveyer and between the first set of pressure rolls and the conveyer, and feeding an additional strip to the tread as it passes on said second conveyer between a second pair of pressure rolls.

3. In combination, a traveling belt conveyer, a series of pairs of pressure rolls between which said conveyer travels, means for feeding strips of rubber toward the surface of said conveyer and between one roll of each pair and said conveyer, and automatic means at the end of said conveyer for cutting the tread into predetermined lengths.

4. In combination, a traveling belt conveyer, a series of pairs of pressure rolls between which said conveyer travels, means for feeding strips of rubber toward the surface of said conveyer and between one roll of each pair and said conveyer, an endless conveyer arranged at the end of said traveling conveyer to receive the tread therefrom, and means for automatically cutting the tread into predetermined lengths as delivered on said endless carrier.

5. In combination, calender rolls suitably heated, means for cutting the sheet of rubber produced thereby into strips, a traveling conveyer, a series of pairs of pressure rolls between which said conveyer travels, means for feeding said strips respectively to successive pressure rolls, and automatically operated means for cutting the tread from said rolls into predetermined lengths.

6. In combination with suitably heated calender rolls for rolling a rubber sheet, means for cutting the sheet of rubber produced thereby into strips of predetermined widths, a traveling belt conveyer onto which said strips are delivered, a positioning roll over which said conveyer travels, a second traveling conveyer, a series of pressure rolls between which said second conveyer travels, and means for feeding said strips of rubber from said first named conveyer to the surface of the second conveyer progressively as said second conveyer passes between successive pairs of pressure rolls.

7. In combination with suitably heated calender rolls for rolling a rubber sheet, means for cutting the sheet of rubber produced thereby into strips of predetermined widths, a traveling belt conveyer onto which said strips are delivered, a positioning roll over which said conveyer travels, a second traveling conveyer arranged at an angle to the axis of said positioning roll, a series of pressure rolls between which said second conveyer travels, and means for feeding said strips of rubber from said first named conveyer to the surface of the second conveyer progressively as said second conveyer passes between successive pairs of pressure rolls.

8. In a tread making machine, a positioning roll, a traveling conveyer, pressure rolls between which said conveyer travels, said conveyer traveling at an angle to the axis of said positioning roll.

9. In a machine for making laminated tire treads, a positioning means, means for feeding a series of rubber strips of different widths to said means, and means for plying said strips successively onto each other, the relation of said positioning means and plying means being such that the relative amount of stretch of the respective strips is maintained the same.

10. In a machine for making laminated tire treads, means for positioning and feeding a series of heated rubber strips of different widths, and means for plying said strips successively onto each other, said positioning and feeding means and said plying means being so arranged with respect to each other that the length of the strips therebetween substantially inversely corresponds to the tendency of the respective strips to stretch while moving from said first named to said second named means.

11. In a machine for making laminated tire treads, means for positioning a series of heated rubber strips of different widths, means for plying said strips successively onto each other, the distance between progressive respective portions of said positioning and plying means varying correspondingly to the widths of said strips.

12. In a tread making machine, the combination of a calender, means for cutting rubber sheets into strips, a positioning roll, an endless belt conveyer to carry said strips of rubber from calender to the positioning roll, pressure rolls and means for synchronizing the speed of the pressure rolls with that of the calender rolls.

13. In combination, suitably heated calender rolls, means for cutting the sheet of rubber produced thereby into strips of different widths, a traveling conveyer onto which said strips are delivered, a series of pressure rolls between which said conveyer travels, means for positioning and feeding said rubber strips onto said traveling conveyer, and means for delivering said strips produced by said calender rolls to said positioning and feeding means and preventing the stretch of the rubber strips during such delivery.

Signed at Los Angeles, California, this 11th day of July, 1917.

HOWARD I. MORRIS.

Witnesses:
 LEONARD S. LYON,
 L. BELLE WEAVER.